US006785126B2

(12) United States Patent
Hazzard et al.

(10) Patent No.: US 6,785,126 B2
(45) Date of Patent: Aug. 31, 2004

(54) PROTECTIVE CASE AND KEYBOARD SYSTEM FOR A HANDHELD COMPUTER

(75) Inventors: Thomas B. Hazzard, Providence, RI (US); Tracy Leigh Hazzard, Providence, RI (US); Joey Gyomay Nakayama, Oak Parjk, IL (US)

(73) Assignee: ttools, LLC, Jamestown, NY (US)

( * ) Notice: Subject to any disclaimer, the term of this patent is extended or adjusted under 35 U.S.C. 154(b) by 0 days.

(21) Appl. No.: 10/063,658

(22) Filed: May 7, 2002

(65) Prior Publication Data

US 2002/0163778 A1 Nov. 7, 2002

Related U.S. Application Data

(60) Provisional application No. 60/289,074, filed on May 7, 2001.

(51) Int. Cl.[7] ................................................ G06F 1/16
(52) U.S. Cl. ....................................... 361/680; 361/683
(58) Field of Search ................................. 361/680, 686

(56) References Cited

U.S. PATENT DOCUMENTS

| | | |
|---|---|---|
| 3,940,758 A | 2/1976 | Margolin |
| 4,939,514 A | 7/1990 | Miyazaki |
| 5,198,991 A | 3/1993 | Pollitt |
| 5,278,779 A | 1/1994 | Conway et al. |
| 5,548,477 A | 8/1996 | Kumar et al. |
| 5,574,481 A | 11/1996 | Lee |
| 5,653,543 A | 8/1997 | Abe |
| 5,712,760 A | 1/1998 | Coulon et al. |
| 5,733,056 A | 3/1998 | Meagher |
| 5,933,320 A | 8/1999 | Malhi |
| 5,941,648 A | 8/1999 | Robinson et al. |
| 5,943,041 A | 8/1999 | Allison et al. |
| 5,982,613 A | 11/1999 | Sternglass et al. |
| 5,995,025 A | 11/1999 | Sternglass et al. |
| 6,022,156 A | 2/2000 | Blish |
| 6,088,220 A | 7/2000 | Katz |
| 6,107,988 A | 8/2000 | Phillipps |
| 6,108,200 A | 8/2000 | Fullerton |
| 6,123,474 A | 9/2000 | Stanton et al. |
| 6,128,372 A | 10/2000 | Tsai et al. |
| 6,147,858 A | 11/2000 | Takahashi ................... 361/680 |
| 6,151,012 A | 11/2000 | Bullister |
| 6,168,331 B1 | 1/2001 | Vann |
| 6,189,056 B1 | 2/2001 | Ogura et al. |
| 6,480,377 B2 * | 11/2002 | Genest et al. |
| 6,630,811 B1 * | 10/2003 | Gioscia ....................... 320/107 |

OTHER PUBLICATIONS

Olodort et al. (US 2003/0084902 A1), "Foldable Keyboard", Jul. 4, 2002.*
Hsieh et al. (US 2003/0048595 A1), "Collapsible Keyboard," Mar. 13, 2003.*

* cited by examiner

*Primary Examiner*—Yean Hsi Chang
(74) *Attorney, Agent, or Firm*—Barlow, Josephs & Holmes, Ltd.

(57) ABSTRACT

A case for a PDA includes a keyboard, and a pass-through I/O port so that the PDA does not have to be removed from the case for docking. The case includes front and rear panels hinged in a clamshell configuration. The rear panel includes a docking port configured to mate with the PDA. The docking port includes an inner electrical connector configured to mate with an I/O connector on the PDA. The docking port further includes an outer electrical connector configured to mate with a docking connector on a docking cradle. The front panel includes a keyboard assembly and is movable between a closed position wherein the keyboard assembly overlies the PDA display screen and an open position wherein the keyboard is oriented for data entry and the rear panel is oriented at a viewing angle. The keyboard is segmented into a main section and first and second folding sections pivotally coupled to the main section. The main, first and second sections each include a plurality of keys respectively defining discrete portions of the keyboard assembly. The folding sections are movable between a closed position and an open position wherein the keyboard sections are joined together for operation thereof.

20 Claims, 10 Drawing Sheets

PROTECTIVE CASE AND KEYBOARD SYSTEM FOR A HANDHELD COMPUTER

CROSS REFERENCE TO RELATED APPLICATIONS

This application claims the benefit of U.S. Provisional Patent Application Ser. No. 60/289,074, filed May 7, 2001, incorporated herein by reference.

BACKGROUND OF INVENTION

The present invention relates to accessories for handheld computer devices, such as personal digital assistants (PDA's), and more particularly relates to a protective case for a PDA having an integrated keyboard system, and a pass through input/ouput (I/O) port so that the PDA does not have to be removed from the case for docking with its associated cradle.

Handheld computer devices, such as PDA"s and palm size computers rely heavily on the use of a stylus for data input. In this regard, the stylus is used on a touch sensitive screen to input data by either touching display keys on an on-screen software keyboard, or by writing on the touch screen in a handwriting recognition thereof. The on-screen software keyboard mimics the keys of a conventional keyboard, and provides the full functionality for key-based input. However, because of the size and proximity of all of the keys, the speed and accuracy of input is compromised. Handwriting recognition provides greater flexibility and speed in data input, but requires a knowledge of the correct character strokes corresponding to letters and characters and even when the correct strokes are used, the handwriting input is highly variable by user and is thus prone to many errors.

To minimize stylus-based data entry directly on the PDA, most users of PDA devices take advantage of the synchronization functions of PDA with desktop/laptop computers. Any data entered on the user's main computer is automatically synchronized with the PDA when the PDA is mounted in a docking cradle that is connected to the computer. Multiple entries and changes can be quickly made on the user"s main computer by entering the data on a conventional sized keyboard. These changes are then automatically transferred to the PDA upon use of the synchronization feature. It is obvious that the speed and convenience of using a full-size keyboard far surpasses stylus based data entry. However, there are many situations where the user does not have access to their main computer to make the necessary entries, or even if accessible, it is not convenient to operate the user"s main computer. For example, business travelers often travel with laptop computers, which may, or may not, be their main computer. Furthermore, for the traveler who desires to make good business use of travel time, the space limitations of plane and train seats often prevent operation or make it inconvenient to operate a laptop computer, forcing the traveler to make the tedious contact and calendar entries by stylus.

As a partial solution to these problems, a number of different portable keyboard systems have been made available as accessories to the various types and models of PDA"s. Some of the keyboards connect to the PDA"s by cables, while others include docking ports for mounting of the PDA onto the keyboard housing structure. Several of the keyboard systems include miniature QWERTY keyboards while others offer full size keyboards. While these keyboard accessories are certainly valuable tools, each has its own limitations and drawbacks. The keyboard systems that are attached by cables are sold as stand alone unit, and require the user to carry a separate device and further require manual connection of the cables for each use thereof. The keyboard systems that include a docking port, eliminate the need for cables, but are also separate devices that must be carried in addition to the PDA itself, and must be connected to the PDA for each use. Accordingly, there is a continuing need in the industry for further improved keyboard systems that will facilitate widespread use and adoption of this class of devices.

SUMMARY OF INVENTION

The present invention seeks to provide a unique and novel keyboard accessory for a PDA by integrating the features of keyboard system and an I/O pass through port in a protective case wherein the PDA can be substantially permanently mounted in the case and need not be removed from the case for docking with the PDA cradle.

More specifically, the case includes front and rear protective panels hinged in a clamshell configuration. The PDA is received between the panels effectively covering and protecting the front and rear surface of the PDA during use. One of the more important aspects of the invention is that the front and rear panels are configured to substantially conform to the corresponding outer peripheral edges of the PDA so that the case does not occupy much more space that the PDA itself. The rear panel includes a docking port at the bottom edge configured to receive the PDA in mated relation as the PDA is received on an inner surface of the rear panel. The docking port actually forms a part of the hinge mechanism connecting the front and rear panel. The docking port includes an electrical connector adjacent the inner surface that is specifically configured to mate with a corresponding I/O connector on the PDA. The docking port further includes a second electrical connector adjacent the outside surface configured to mate with a corresponding docking connector on the PDA"s associated docking cradle. The two electrical connectors are in communication so that they function as a pass through when the case is docked with the cradle. This allows the case to be inserted into the docking cradle without removing the PDA from the case. This feature is of tremendous benefit to those that routinely synchronize information, and for PDA"s having a rechargeable battery that is charged while docked in the cradle.

The front panel includes a keyboard assembly having a plurality of keys disposed on the inner surface thereof. The keyboard is electrically connected to the electrical connectors in the docking port so that the keyboard is in electrical communication with the I/O port of the PDA. The front panel is movable between a closed position wherein the keyboard assembly overlies the PDA display and an open position wherein the outer surface thereof is received on a supporting surface and the keyboard is oriented for data entry. The keyboard is oriented so that the top edge of the keyboard is adjacent the connecting hinge. In this position, the rear panel is oriented at an upright viewing angle relative to the supporting surface so that the PDA display is visible. The rear panel also includes a support leg to support the rear panel at a desired upright viewing angle.

Another important aspect of the invention is that the front panel and keyboard are segmented into a main section, which is the part that is hinged to the rear panel and first and second folding sections pivotally coupled to the main section. The main section includes a plurality of keys defining a central portion of the keyboard, while the first and second folding sections each include a plurality of keys respectively defining left and right side portions of the keyboard assembly. The folding sections can be configured in a closed position adjacent the bottom edge of the main section wherein the keyboard is disjointed. In this position, the keys of the keyboard are actually positioned upside down. This is the normal cover configuration position where the keyboard is not normally in use. The folding sections are then pivotally movable from the bottom edge of the main section outwardly to an open position adjacent opposing side edges of the main section. In this open position, the keyboard assembly is joined together in its proper QWERTY configuration for operation thereof.

Accordingly, among the objects of the instant invention are: the provision of a protective case for a PDA in which the PDA can be mounted for long term storage and use; the provision of such a case configured with a pass through docking port so that the PDA does not have to be removed from the case for docking with a cradle; the provision of a protective case for a PDA that includes an integrated full-size, fully functional keyboard assembly; the provision of such a keyboard assembly wherein the keyboard is segmented into reconfigurable sections; and the provision of such a protective case including a support leg for supporting the rear panel at a desired viewing angle.

Other objects, features and advantages of the invention shall become apparent as the description thereof proceeds when considered in connection with the accompanying illustrative drawings.

BRIEF DESCRIPTION OF DRAWINGS

The following drawings illustrate the best mode presently contemplated for carrying out the present invention, wherein.

DETAILED DESCRIPTION

Figure 1:
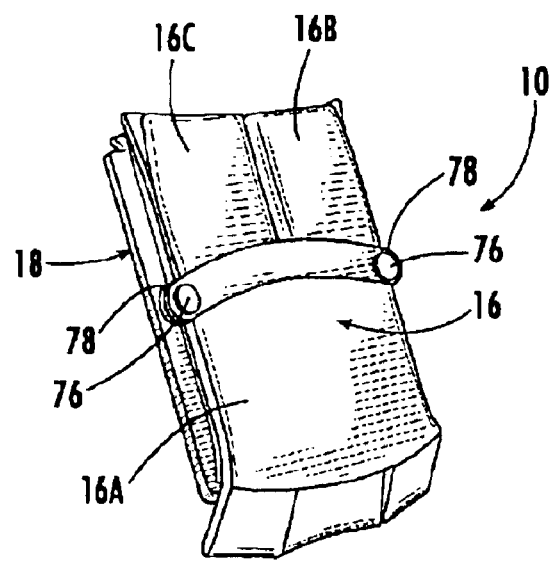
FIG. 1 is a perspective view of the protective case of the present invention as seen with a handheld computer device mounted thereon, and with the front panel in a closed position.

Referring now to the drawings, the protective case of the instant invention is illustrated and generally indicated at 10 in FIGS. 1–10. As will hereinafter be more fully described, the instant invention provides a unique and novel keyboard/case accessory for a handheld computer device 12, by integrating the features of a conventional QWERTY keyboard and an input/output (I/O) pass-through port in a protective case wherein the handheld computer device 12 can be substantially permanently mounted in the case 10 and so that it need not be removed from the case 10 for docking with a power/data synchronization cradle 14 (see FIG. 10).

Within the scope of the present invention, the term "handheld computer device" is intended to include, but is not limited to, personal digital assistants (PDA"s), which are typically used in conjunction with a docking cradle 14 for the purpose of synchronizing data with another computer system and/or for charging of a rechargeable battery within the device. For ease of discussion, the terms "handheld computer device" and PDA will be used interchangeably, the disclosure is not intended to be limited by use of one term or the other.

Figure 2:
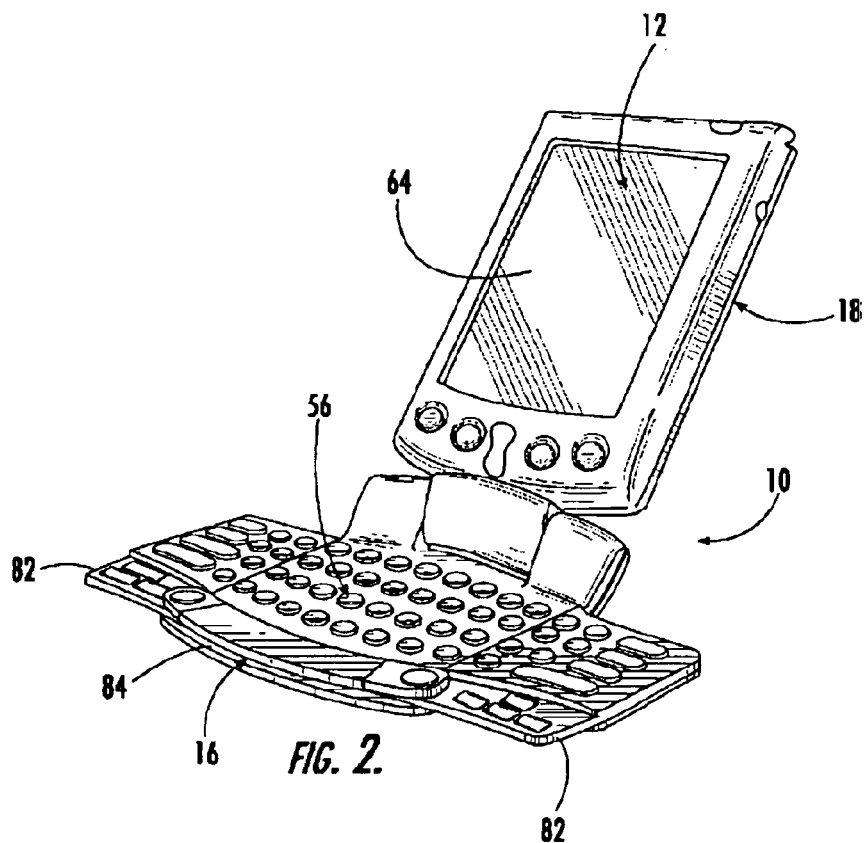
FIG. 2 is another perspective view thereof as seen with the front panel in an open position and the keyboard assembly in its open operational position.
Figure 3:
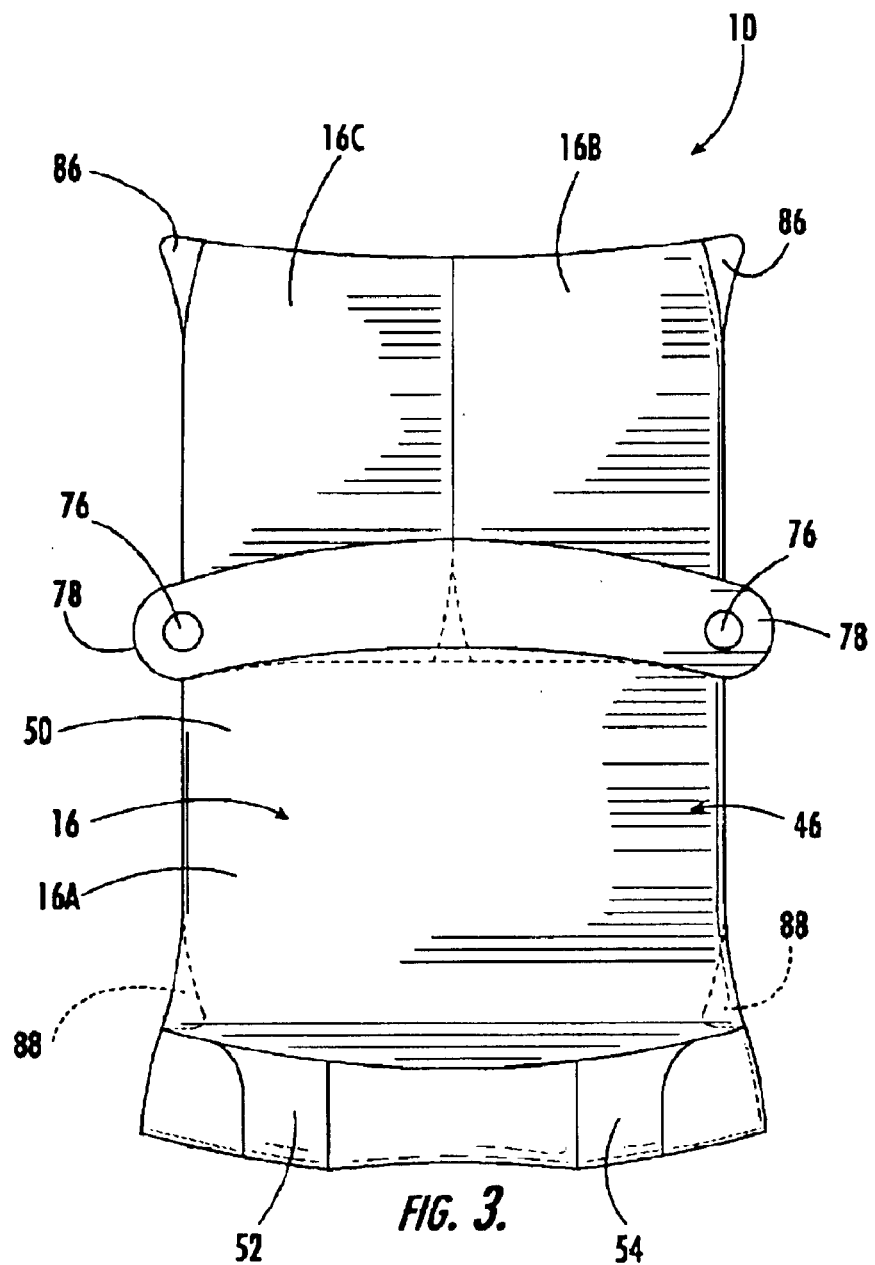
FIG. 3 is a front view of the protective case without the handheld computer device, and with the front panel in a closed position.
Figure 4:
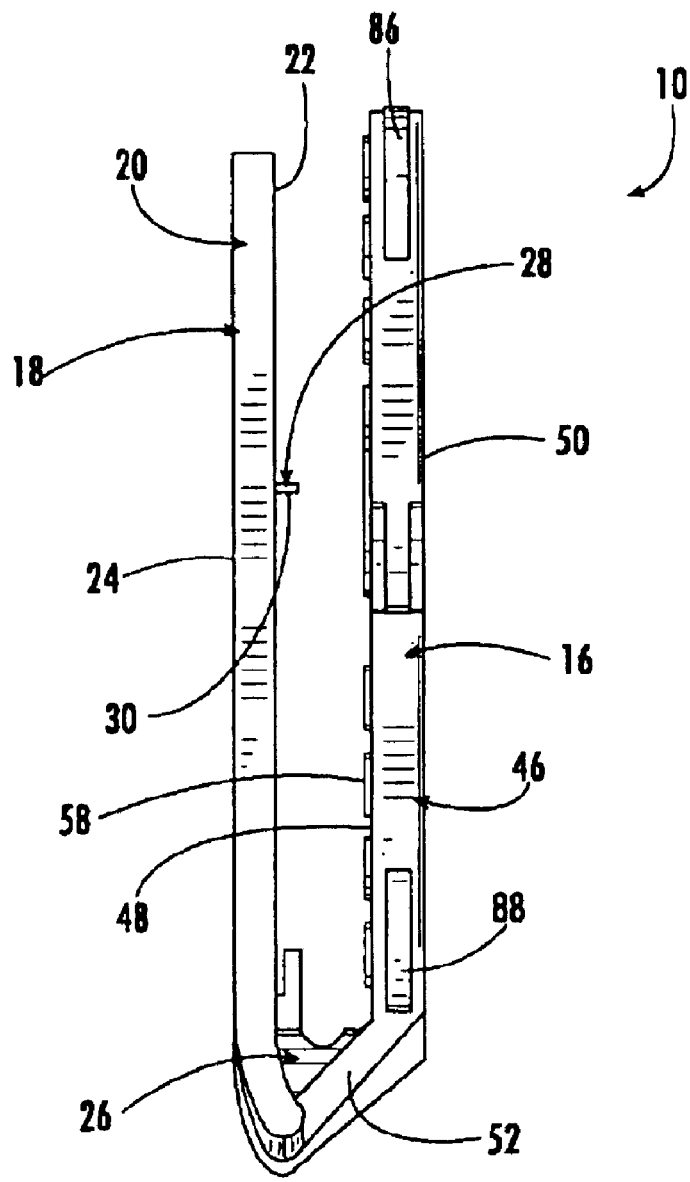
FIG. 4 is a side view thereof.

The protective case 10 includes a front panel, generally indicated at 16, and a rear panel, generally indicated at 18, the front panel and rear panel being hinged in a clamshell configuration as best seen in FIGS. 1, and 3–5. Referring to FIGS. 1 and 2, the PDA 12 is received between the panels 16, 18 for the purpose of covering and protecting the front and rear surfaces of the PDA 12 during use thereof. As can be seen in FIG. 1, the front and rear panels 16, 18 are configured and dimensioned to substantially conform to the corresponding outer peripheral edges of the PDA 12 so that the case 10 does not have a substantially larger footprint than the PDA itself. The front and rear panels 16, 18 are preferably molded, or otherwise constructed, from a substantially rigid plastic material. However, it is to be understood that the case 10 could be constructed in whole, or in part, from other suitable materials.

The rear panel 18 includes a main body portion 20 having inner and outer surfaces 22, 24 respectively, and further includes a docking port generally indicated at 26, configured to receive the PDA 12 in a mated relation as the PDA 12 is received on the inner surface 22 of the rear panel 18. The docking port 26 is preferably integrally formed with the main body portion 20 and forms a part of the hinge mechanism connecting the front and rear panels 16, 18. As can be seen from FIG. 2, the docking port 26 forms the central hinge arm of the hinge mechanism. In order to securely maintain the PDA 12 in mated configuration with the case 10, the inner surface 22 of the rear panel 18 preferably includes a releasable fastening device 28. The preferred embodiment of the fastening device 28 comprises a spring-biased sliding latch that projects inwardly from the center of the inner surface 22. The sliding latch includes a hook portion 30 that releasably engages with an opening (not shown) formed in the rear surface of the PDA 12 and an actuator tab 32 that is accessible from the outer surface 24 of the rear panel 18. It is noted that use of the described fastener 28 is only possible when there is a complementary opening in the PDA 12. Alternatively, the fastener 28 may comprise adhesive substances, hook and pile fabrics, and/or any other suitable selectively releasable materials, or mechanical arrangements.

Referring to FIGS. 5 and 7–10, the docking port 26 includes a first electrical connector 34 adjacent the inner surface 22 of the rear panel 18 that is specifically configured to mate with a corresponding I/O connector 36 on the PDA 12. The docking port 26 further includes a second electrical connector 40 adjacent the outside surface 24 of the rear panel 18 configured to mate with a corresponding docking connector 42 on the PDA"s associated docking cradle. The two electrical connectors 34, 40 are in electrical communication through wires 44 (FIG. 10) so that the connectors 34, 40 function as a pass-through connector when the case 10 is docked with the cradle 14. the physical configuration of the docketing port 26 and the arrangement of the connectors 34, 40 allows the case 10 to be inserted into the docking cradle 14 without removing the PDA 12 from the case 10. This feature is of tremendous benefit for those that routinely synchronize data with another computer, and for those PDA"s having a rechargeable battery that is charged while the PDA is connected to the cradle.

The front panel 16 includes a main body portion 46 having inner and outer surfaces 48, 50, and further including spaced hinge arms 52, 54 that pivotally engage and cooperate with the docking port 26 (central hinge arm) of the rear panel 18 to form the hinge mechanism. The hinge pins (not shown) that form the pivot connection are preferably formed in a hollow configuration to permit wiring to pass between the docking port 26 and the front panel 16. The main body 46 of the front panel 16 includes a keyboard assembly generally indicated at 56 having a plurality of data entry keys 58 disposed on the inner surface 48 thereof. The keyboard assembly 56 also includes a keyboard controller 60 containing the necessary electronic firmware to control operation of the keyboard assembly 56. The keys 58 and keyboard controller 60 are electrically connected to the electrical connectors 34, 40 by wires 26 (FIG. 10) passing through the hinge mechanism so that the keyboard assembly 56 is in electrical communication with the I/O port 36 of the PDA 12. In this regard, it is noted that the keys 58 and keyboard controller 60 draw electrical power from the battery of the PDA 12 when connected thereto.

In use, the front panel 16 is movable between a closed position (FIGS. 1, and 3–5) and an open position (FIGS. 2 and 6–9). In the closed position, the keyboard assembly 56 overlies the PDA display 64 as seen in the noted drawings figures. From the closed position, the front panel 16 is pivotally movable to an open position wherein the outer surface 50 thereof is received on a supporting surface (See FIGS. 2 and 6) and the keyboard assembly 56 is oriented in a generally prone position for data entry. More specifically, the keyboard 56 is oriented so that the top edge of the keyboard 56 is adjacent the hinge mechanism. In this position, the rear panel 18 is oriented at an upright viewing angle relative to the supporting surface so that the PDA display is visible to a user seated or positioned in front of the keyboard assembly (See FIG. 6).

Figure 5:
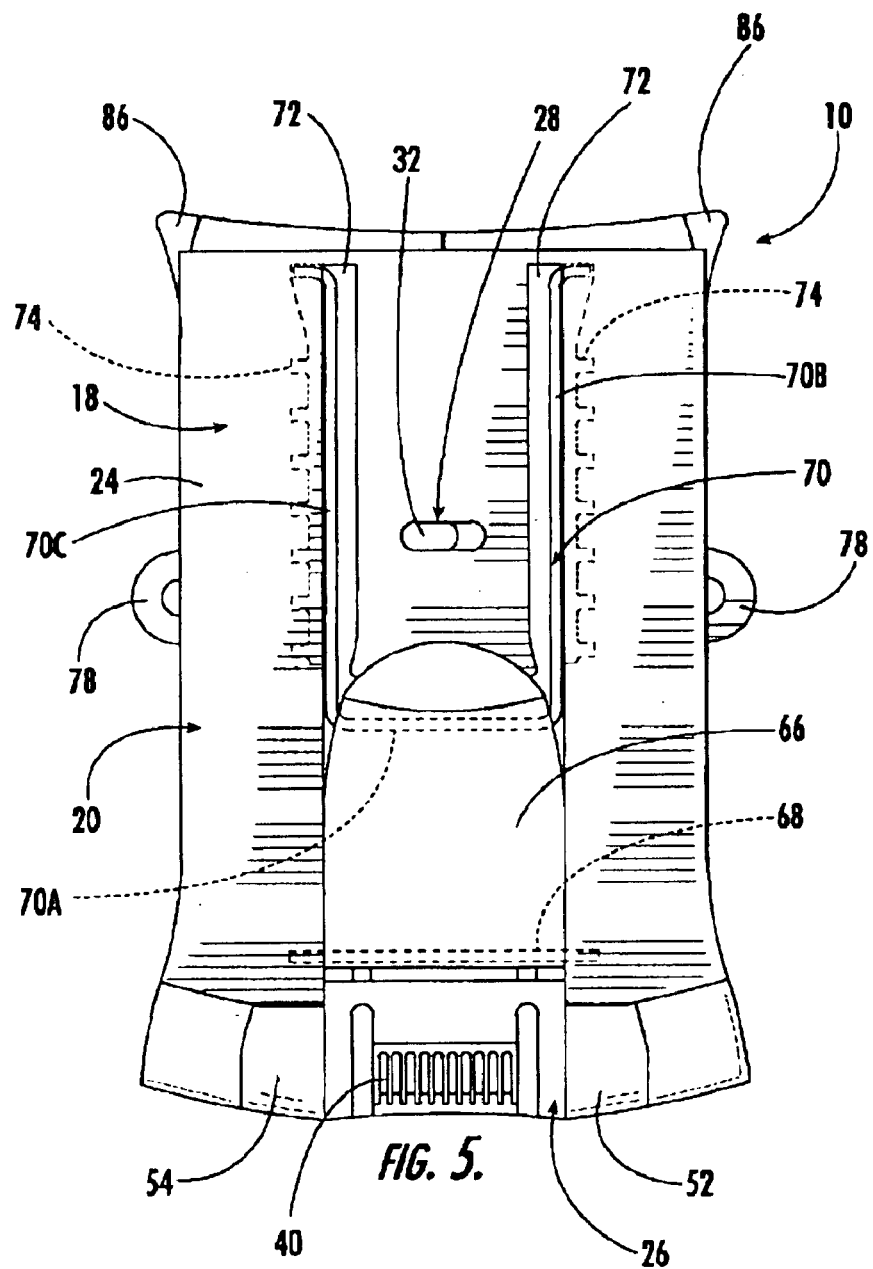
FIG. 5 is a back view thereof.
Figure 6:
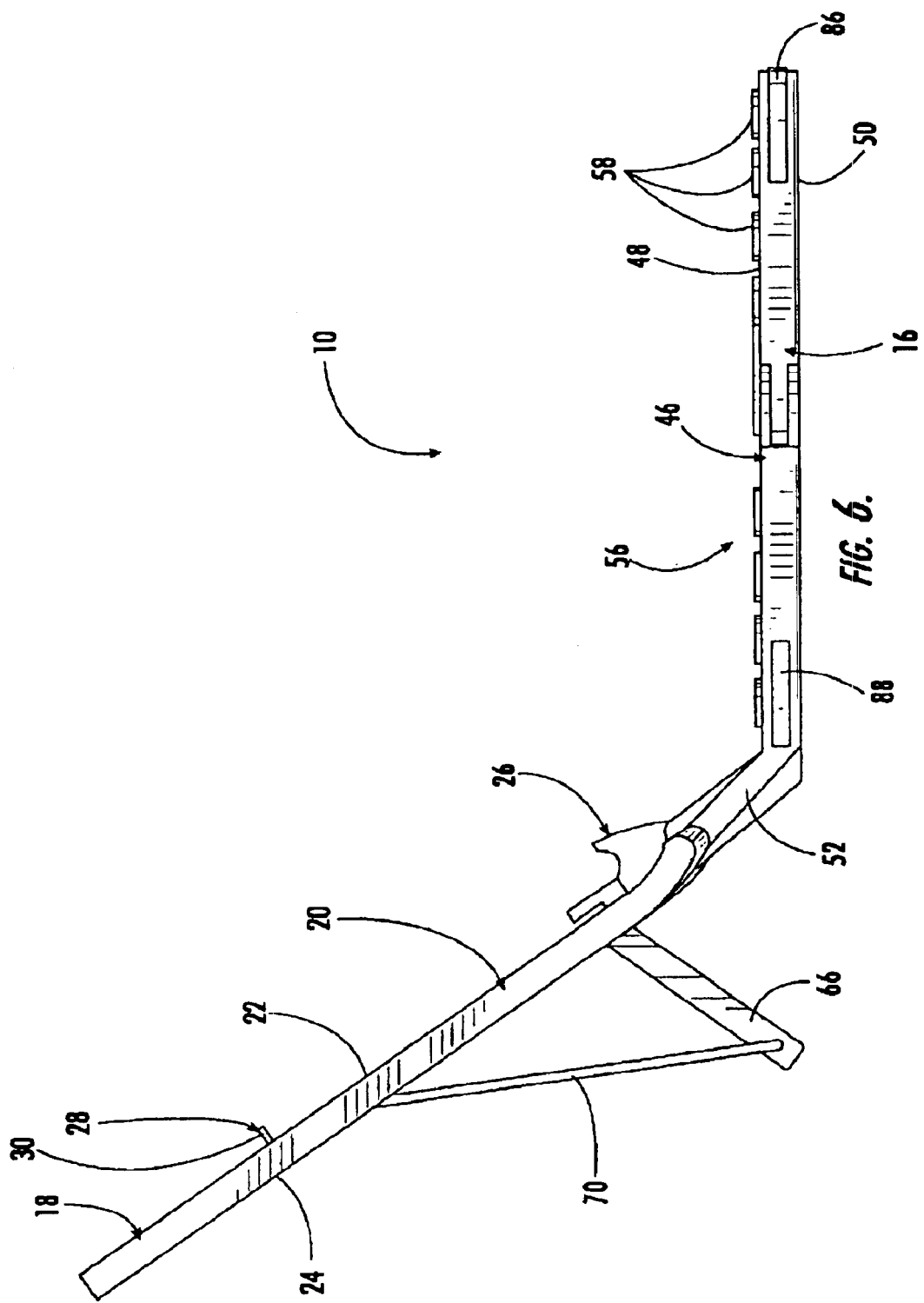
FIG. 6 is another side view of the case with the front panel in an open position.

Turning to FIGS. 5 and 6, the rear panel 18 also includes a support member generally indicated at 66 to support the rear panel 18 at a desired upright viewing angle. The lower end of the support member 66 is pivotally mounted to the panel by a pivot pin 68 (broken lines) while the upper end is provided with an adjustable U-shaped easel arm 70. The lower base end 70A of the easel arm 70 is pivotally mounted to the top of the support member 66 with the legs 70B, 70C of the easel arm being slidably received in spaced channels 72 formed in the outer surface 24 of the panel 18. The channels 72 include spaced notches 74 for receiving the ends of the legs 70B, 70C of the easel arm 70. The preferred orientation and position of the support member 66 is best shown in FIG. 6.

Figure 7:
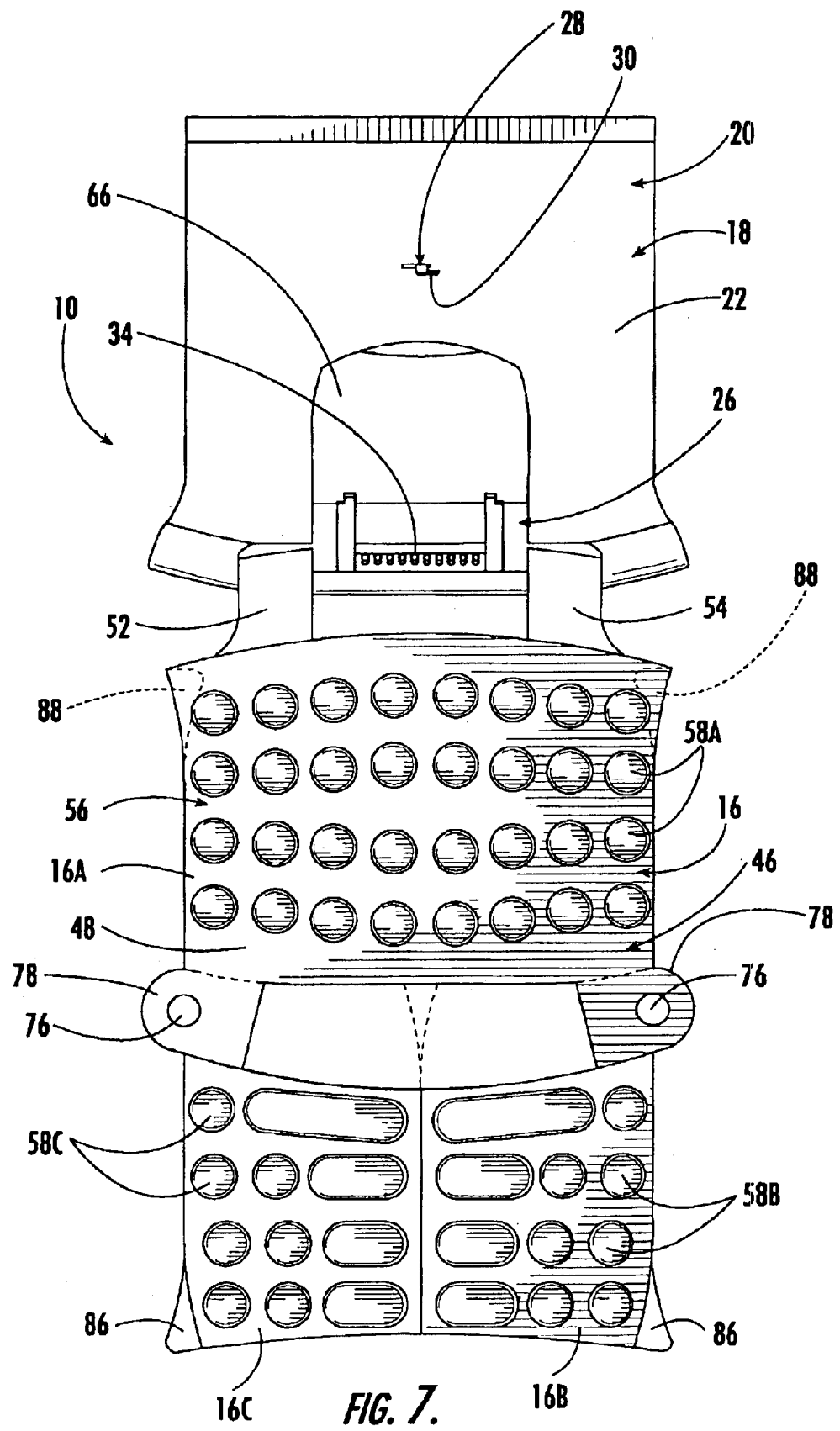
FIG. 7 is a top view thereof with the keyboard sections in their closed position.
Figure 8:
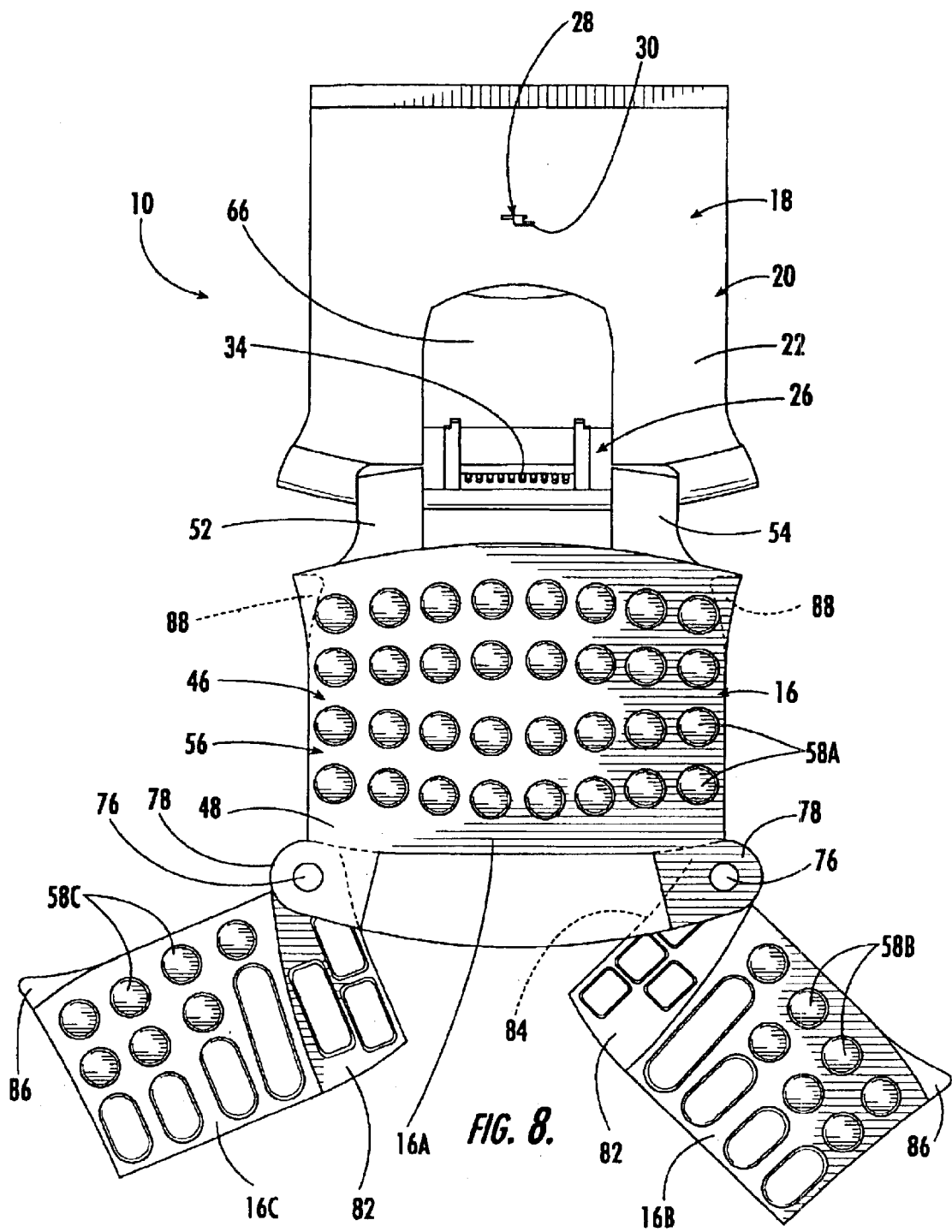
FIG. 8 is another top view thereof with the keyboard sections in a partially open position.
Figure 9:
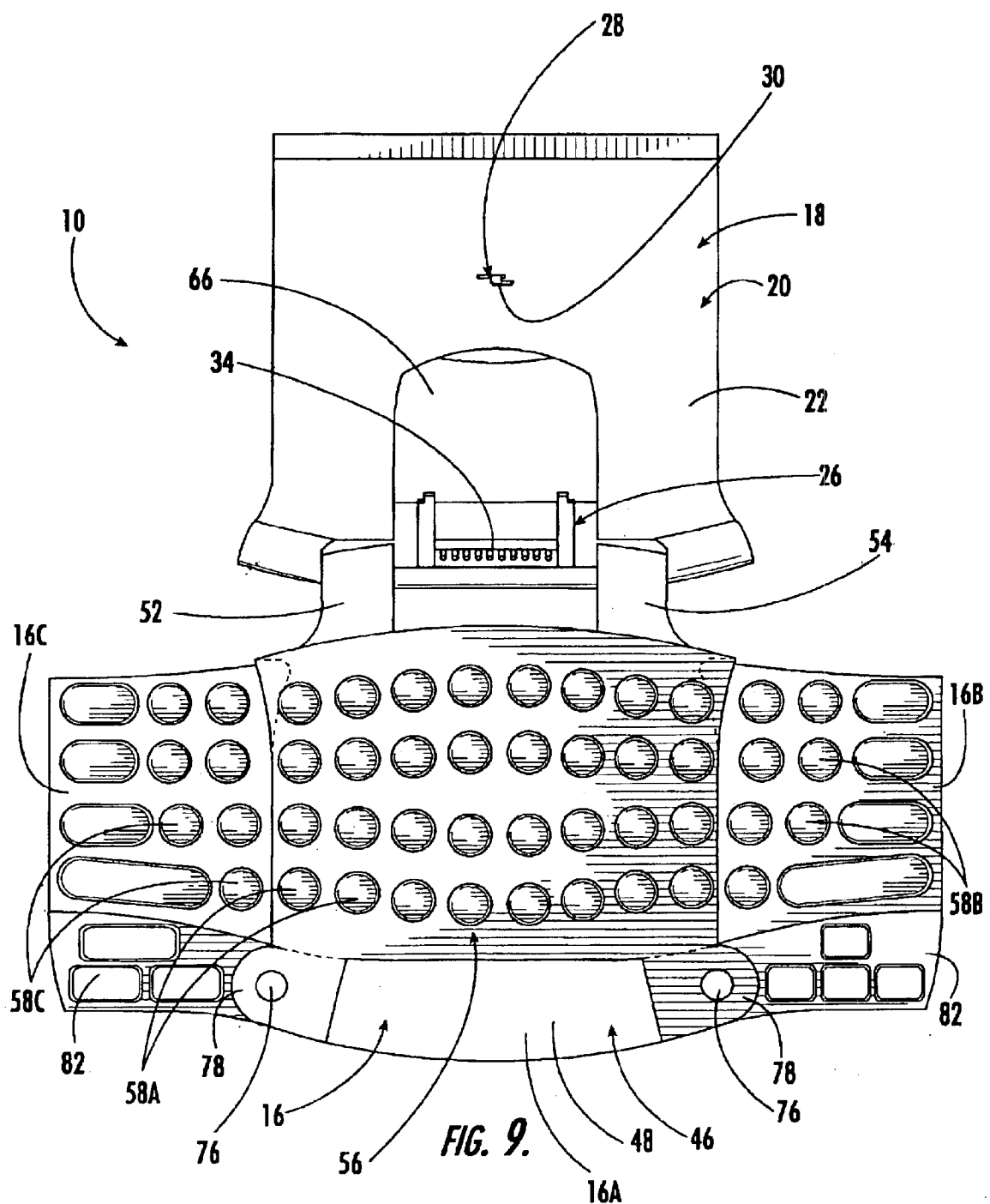
FIG. 9 is yet another top view thereof with the keyboard sections in their open operational position.
Figure 10:
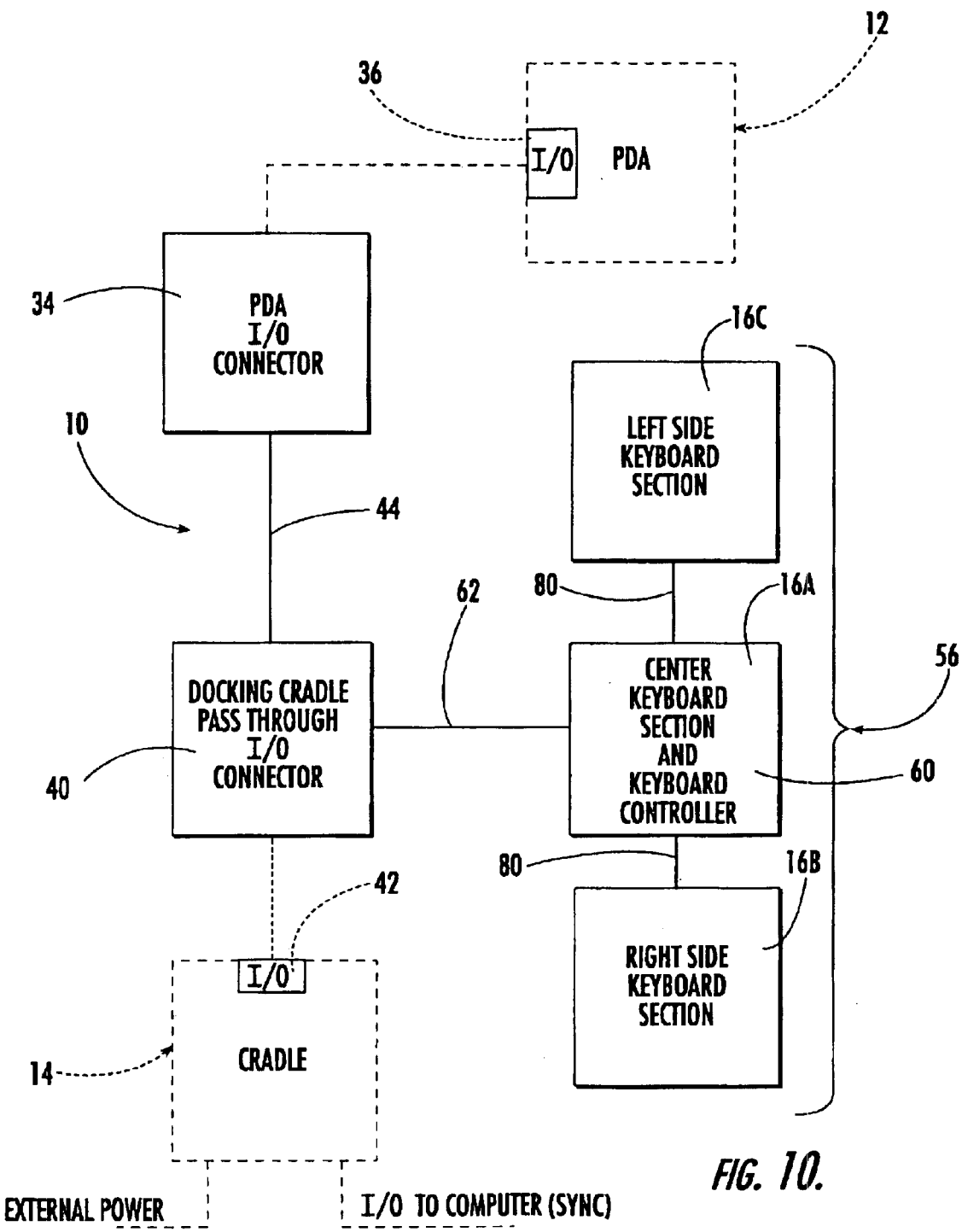
FIG. 10 is a schematic illustration of the electronic components of the case.

Turning to FIGS. 7–9, it can be seen that the front panel 16 is segmented into a main section 16A, which is the part of the front panel that is hinged to the rear panel 18, and first and second folding sections 16B, 16C which are pivotally coupled to the main section 16A. The main section 16A includes a plurality of keys 58A defining a central portion of the keyboard, while the first and second folding sections each include a plurality of keys 58B, 58C respectively defining left and right side portions of the keyboard assembly.

The left and right folding sections 16B, 16C are respectively pivotally mounted to the bottom corners of the main section 16A by means of pivot pins 76 received in pivot bosses 78 formed on the respective sections 16A, 16B, 16C. The pivot pins 76 and bosses 78 are preferably formed with a hollow configuration to permit the passage of wires 80 from the folding sections 16B, 16C into the main section 16A.

Referring to FIG. 7, the folding sections 16B, 16C can be configured in a closed position adjacent the bottom edge of the main section 16A wherein the keyboard is disjointed. This is the normal cover configuration position where the keyboard is not normally in use. In this position, the keys 58B, 58C of the folding sections are actually positioned upside down.

The folding sections 16B, 16C are then pivotally movable from the bottom edge of the main section 16A outwardly to an open position adjacent opposing side edges of the main section 16A (See FIGS. 8 and 9). To provide better stability and rigidity of the front panel 16 in the closed position, the top edges of the folding sections 16b, 16C each include a reduced thickness shoulder 82 which is slidably received in a complementary slot 84 formed in the bottom edge of the main section (See FIG. 8).

Turing to FIG. 9, the folding sections 16B, 16C are shown in the open position, wherein the keyboard assembly 56 is joined together in its proper QWERTY configuration for operation thereof. To provide better stability in the open position, the sides of the folding sections 16B, 16C are provided with reduced thickness tabs 86 that are snap received into complementary slots 88 formed in the side edges of the main section 16A adjacent the hinge mechanism (See FIGS. 8 and 9).

It can therefore be seen that the present invention provides a unique and novel protective case 10 for a PDA 12. The case includes a uniquely designed integrated keyboard system 56 that is reconfigurable for storage and use, and therefore does not occupy a substantially larger footprint that the PDA itself. Furthermore, the case 10 includes a highly useful pass through (I/O) port so that the PDA 12 does not have to be removed from the case 10 for docking with its associated cradle 14. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A protective case for a handhold computer device comprising:
    a rear panel having an inner surface and an outer surface;
    a docking port coupled to a bottom edge of said rear panel and configured to receive a handhold computer device in mated relation as said handhold computer device is received and supported on said inner surface of said rear panel,
    said docking port including a first electrical connector adjacent said inner surface of said rear panel and configured to mate with a corresponding I/O connector on said handheld computer device, and a second electrical connector adjacent said outer surface of said roar panel, said docking port and said second electrical connector being configured to mate with a corresponding electrical connector on a docking cradle configured for use with said handhold computer device while said handheld computer device is received in mated relation with said docking port, said second electrical connector being in electrical communication with said first electrical connector such that said connector in said docking cradle is in electrical communication with said electrical connector on said handheld computer device; and a front panel having an inner surface and an outer surface, said front panel having a top edge pivotally coupled to said bottom edge of said rear panel adjacent said docking port, said front panel including a keyboard assembly including a plurality of keys disposed on said inner surface thereof, said keyboard being in electrical communication with said first electrical connector;

said front panel being pivotally movable between a closed position wherein said inner surface thereof is received in closely spaced facing relation to a display surface of said handheld computer device, and an open position wherein said outer surface thereof is received on a supporting surface, said keyboard is oriented for data entry, and said rear panel is oriented at an angle relative to said supporting surface, said front and rear panels having outer peripheral edges substantially conforming to corresponding outer peripheral edges of said handheld computer device.

2. The protective case as claimed in claim 1 wherein said front panel comprises a main section having a top edge pivotally coupled to said rear panel, end further comprises first and second folding sections movably coupled to said main section, said main section including a plurality of keys defining a central portion of said keyboard, said first and second folding sections each including a plurality of keys respectively defining left and right side portions of said keyboard, said first and second folding sections being movable between a closed position adjacent said bottom edge of said main section wherein said keyboard is disjointed, and an open position adjacent opposing side edges of said main section, wherein said keyboard is joined together for operation thereof.

3. The protective case as claimed in claim 2 wherein said first and second folding sections are pivotally coupled to said main section.

4. The protective ease as claimed in claim 3 wherein said main section and said first and second folding sections respectively include complementary interfitting formations that engage in mated interfitting relation when positioned in said open and closed position.

5. The protective case as claimed in claim 2 wherein said main section and said first and second folding sections respectively include complementary interfitting formations that engage in mated interfitting relation when positioned in said open and closed position.

6. The protective case as claimed in claim 2 further comprising a fastener configured to releasably secure said handheld computer device to said rear panel.

7. The protective case as claimed in claim 6 wherein said fastener comprises a latch releasably securing said handhold computer device to said rear panel.

8. The protective case as claimed in claim 2 wherein said rear panel further included a movable support leg on said rear surface thereof for supporting said rear panel at a viewing angle relative to said support surface.

9. The protective case as claimed in claim 1 further comprising a fastener configured to releasably secure said handheld computer device to said rear panel.

10. The protective case as claimed in claim 9 wherein said fastener comprises a latch releasably securing said handhold computer device to said rear panel.

11. The protective case as claimed in claim 1 wherein said rear panel further includes a movable support leg on said rear surface thereof for supporting said rear panel at a viewing angle relative to said support surface.

12. A keyboard system for a handheld computer device comprising:

a keyboard including a main section and first and second pivoting sections pivotally coupled to said main section, said first and second pivoting sections being pivotable between a closed position adjacent a bottom edge of said main section wherein said keyboard is disjointed, and an open position adjacent opposing side edges of said main section, wherein said keyboard is joined together for operation thereof, said first and second sections being substantially co-planar with said main section in both said open and closed positions; and an attachment means adjacent a top edge of said main section configured to maintain said keyboard in mated relation to a handheld computer device, said attachment means including an electrical connector configured to connect to corresponding I/O circuitry in said handheld computer device, said keyboard being in electrical communication with said electrical connector.

13. The keyboard system of claim 12 wherein said main section includes a plurality of keys defining a central portion of said keyboard, said first and second pivoting sections each include a plurality of keys respectively defining left and right side portions of said keyboard.

14. The keyboard system as claimed in claim 12 wherein said main section and said first and second folding sections respectively include complementary interfitting formations that engage in mated interfitting relation when positioned in said open and closed position.

15. The keyboard system as claimed in claim 14 wherein said main section and said first and second folding sections respectively include complementary interfitting formations that engage in mated interfitting relation when positioned in said open and closed position.

16. A docking assembly for a handheld computer device comprising:

a docking port having a first end configured to receive a handhold computer device in mated relation, and a second end configured to be received in mated relation in a docking cradle configured for use with said handhold computer device said first end of said docking port including a first electrical connector configured to mate with a corresponding I/O connector on said handheld computer device, a second end of said docking port including a second electrical connector configured to mate with a corresponding I/O electrical connector on said docking cradle while said handheld computer device is received in mated relation with said docking port, said second electrical connector being in electrical communication with said first electrical connector such that said I/O electrical connector in said docking cradle is in electrical communication with said I/O electrical connector in said handheld computer device; and a peripheral electronic device in electrical communication with at least one of said first and second electrical connectors.

17. The docking assembly of claim 16 wherein said peripheral electronic device comprises a keyboard.

18. The docking assembly of claim 17 wherein said keyboard includes a main section and first and second folding sections movably coupled to said main section, said first and second folding sections being movable between a closed position adjacent a bottom edge of said main section wherein said keyboard is disjointed, and an open position adjacent opposing side edges of said main section, wherein said keyboard is joined together for operation thereof.

19. The keyboard system of claim 18 wherein said main section includes a plurality of keys defining a central portion of said keyboard, said first and second folding sections each include a plurality of keys respectively defining left and right side portions of said, keyboard.

20. The keyboard system as claimed in claim 18 wherein said first and second folding sections are pivotally coupled to said main section.

* * * * *